(12) United States Patent
Lee

(10) Patent No.: US 7,951,486 B2
(45) Date of Patent: May 31, 2011

(54) CAP ASSEMBLY AND SECONDARY BATTERY USING THE SAME

(75) Inventor: Sang-Joon Lee, Suwon-si (KR)

(73) Assignee: Samsung SDI Co., Ltd., Gongse-dong, Gilheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 12/193,420

(22) Filed: Aug. 18, 2008

(65) Prior Publication Data

US 2009/0092897 A1  Apr. 9, 2009

(30) Foreign Application Priority Data

Oct. 5, 2007  (KR) .................. 10-2007-0100372

(51) Int. Cl.
*H01M 2/08* (2006.01)
(52) U.S. Cl. .......... 429/175; 429/164; 429/176
(58) Field of Classification Search .......... 429/175
See application file for complete search history.

(56) References Cited

U.S. PATENT DOCUMENTS

| | | | |
|---|---|---|---|
| 6,440,601 B1 * | 8/2002 | Aoi et al. | 429/96 |
| 2001/0012582 A1 * | 8/2001 | Kim | 429/184 |
| 2003/0148174 A1 * | 8/2003 | Gu | 429/129 |
| 2005/0208345 A1 * | 9/2005 | Yoon et al. | 429/7 |
| 2006/0057459 A1 * | 3/2006 | Kwon et al. | 429/174 |
| 2006/0263685 A1 * | 11/2006 | Kwon | 429/185 |
| 2007/0154797 A1 * | 7/2007 | Hyung et al. | 429/174 |

FOREIGN PATENT DOCUMENTS

| | | |
|---|---|---|
| JP | 11-167909 | 6/1999 |
| JP | 2004-259625 | 9/2004 |
| JP | 2006-100097 | 4/2006 |
| JP | 2006100097 | * 4/2006 |
| JP | 2007-095656 | 4/2007 |
| KR | 20-0186979 | 4/2000 |
| KR | 2005-0049835 | 5/2005 |
| KR | 2005-0121115 | 12/2005 |
| KR | 2006-0023469 | 3/2006 |

OTHER PUBLICATIONS

"Korean Office Action" issued on Mar. 25, 2009 in Applicant's corresponding Korean Patent Application No. 2007-0100372.
Transmitter letter and the Korean Notice of Allowance issued by Korean Patent Office on Sep. 16, 2009 in the corresponding Korean Patent Application No. 10-2007-0100372.

* cited by examiner

*Primary Examiner* — Ula C Ruddock
*Assistant Examiner* — Patricia Davis
(74) *Attorney, Agent, or Firm* — Robert E. Bushnell, Esq.

(57) ABSTRACT

A cap assembly for a secondary battery in which an insulating member is disposed in a partial or entire terminal plate, resulting in improved stability. The cap assembly includes a terminal plate and an insulating member. The insulating member is disposed in a partial or entire region of the terminal plate other than a region to which a negative electrode tab is welded.

19 Claims, 2 Drawing Sheets

CAP ASSEMBLY AND SECONDARY BATTERY USING THE SAME

CLAIM OF PRIORITY

This application makes reference to, incorporates the same herein, and claims all benefits accruing under 35 U.S.C. §119 from an application for CAP ASSEMBLY AND SECONDARY BATTERY USING THE SAME earlier filed in the Korean Intellectual Property Office on 5 Oct. 2007 and there duly assigned Serial No. 2007-0100372.

BACKGROUND OF THE INVENTION

1. Field of the Invention

The present invention relates to a cap assembly and a secondary battery using the same, and more particularly, to a cap assembly and a secondary battery using the same in which an insulating member is disposed in a partial or an entire of a terminal plate, resulting in improved stability.

2. Description of the Related Art

Rechargeable secondary batteries are economical in comparison to disposable dry cells. In recent years, as low-volume and high-capacity secondary batteries are developed, they are widely used as power supplies for portable electronic/electrical devices, such as cellular phones, camcorders, notebook computers and the like.

The secondary batteries include nickel-cadmium batteries, nickel-metal hydride batteries, nickel-zinc batteries, and lithium secondary batteries.

Among them, the lithium secondary batteries are most widely used because of their small size, high capacity, high operating voltage, and high energy density per weight.

The lithium secondary batteries may be classified into can-type lithium secondary batteries and pouch-type lithium secondary batteries depending on shapes of a casing, which accommodates an electrode assembly having a negative electrode plate, a positive electrode plate and a separator. The can-type lithium secondary batteries may be further classified into cylinder-type lithium secondary batteries and prismatic-type lithium secondary batteries.

When the lithium secondary battery is of the can type, the casing is generally formed of a metal such as aluminum and has a cylindrical shape, a prismatic shape, or a pillar shape with rounded edges.

The can has an upper opening through which an electrode assembly is inserted and electrolyte is injected into the can.

The can is then finished by a cap assembly having a size and shape corresponding to the opening of the can, resulting in a sealed bare cell.

When the lithium secondary battery is of the pouch-type, a pouch casing has a space for accommodating an electrode assembly, which is accommodated on a lower surface of the casing.

The lower surface is covered with an upper surface of the pouch casing, and sealing portions are formed at edges of the upper and lower surfaces of the pouch casing and bonded in order to be sealed, resulting in a bare cell.

The bare cell configured above is electrically connected with a protecting circuit board, which includes a protecting device for preventing accident caused by abnormal operation, such as overcharge, overdischarge, overcurrent, and the like.

In general, the electrical connection between the bare cell and the protecting circuit board is made via a lead. Such a secondary battery may be called a core pack.

The core pack is received in a separate casing or a gap of the core pack is filled with a hot-melt resin. The core pack is then subjected to a tubing process with a thin casing and a labeling process, resulting in a battery pack.

In a prismatic-type secondary battery, the conductive terminal plate forming the cap assembly may stab into the electrode assembly or may be brought into contact and short-circuited with the can when the cap assembly finishing the opening of the can is partially distorted and bent toward the electrode assembly by external pressure, causing a stability issue such as a fire and an explosion.

The above information disclosed in this Related Art section is only for enhancement of understanding of the background of the invention and therefore it may contain information that does not form the prior art that is already known to a person of ordinary skill in the art.

SUMMARY OF THE INVENTION

In accordance with an exemplary embodiment, the present invention provides a cap assembly comprising a terminal plate and an insulating member, in which the terminal plate wherein the insulating member disposed in a partial or an entire region of the terminal plate other than a region to which a positive electrode tab is welded.

In accordance with another exemplary embodiment, the present invention provides a secondary battery comprising: an electrode assembly including a negative electrode tab and a positive electrode tab; a can for accommodating the electrode assembly, the can including an upper opening; and a cap assembly for finishing the upper opening, in which the cap assembly comprises a terminal plate and an insulating member, wherein the insulating member disposed in a partial or an entire region of the terminal plate other than a region to which the negative electrode tab is welded.

The insulating member may be coated with poly-ethylene or poly-ethylene-terephthalate.

The insulating member may comprise an insulating tape attached thereon.

The secondary battery is of an inner pack type or a hard pack type.

According to the present invention, it is possible to prevent the conductive terminal plate forming the cap assembly from stabbing into the electrode assembly or from being brought into contact and abnormally short-circuited with the can when the cap assembly finishing the opening of the can is partially distorted and bent toward the electrode assembly by external pressure.

Thus, a fire and an explosion caused by the abnormal short-circuit can be also prevented, thereby improving stability of the battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
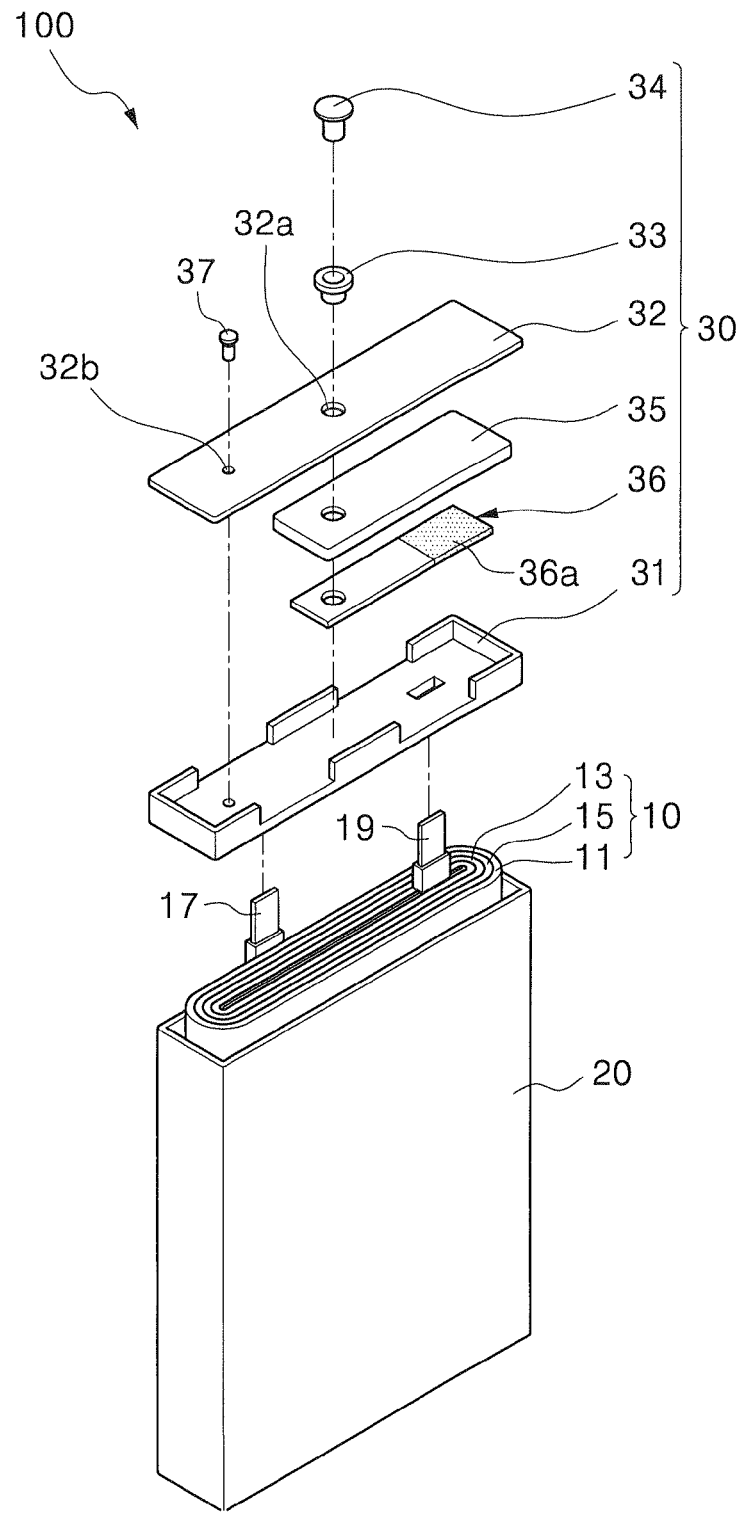
FIG. 1 is an exploded perspective view of a secondary battery according to an embodiment of the present invention.

Hereinafter, preferred embodiments of the present invention will be described in detail with reference to the accompanying drawings. Thicknesses, distances and the like of layers and areas in the drawings may be exaggerated for convenience of illustration.

Figure 2:
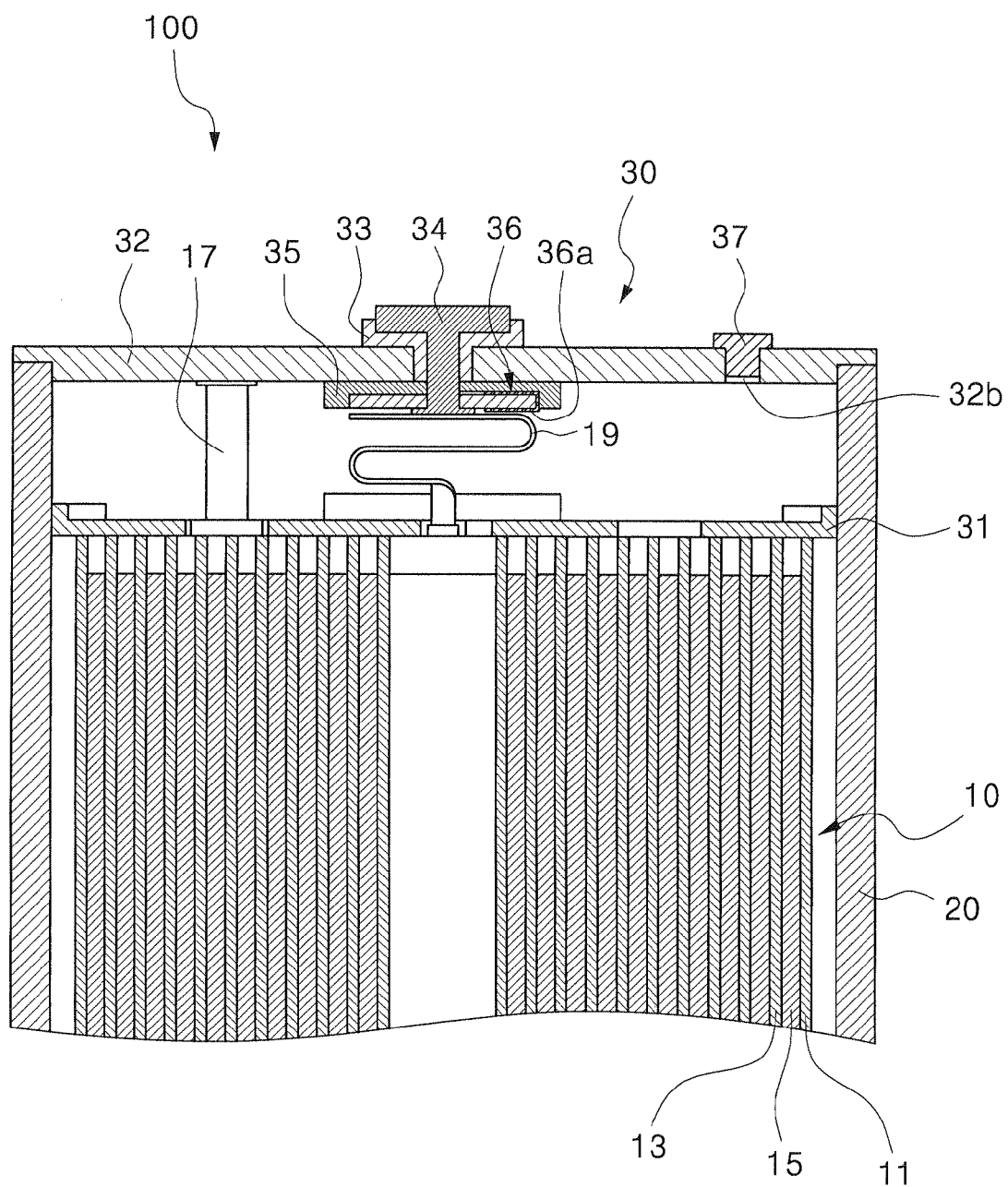
FIG. 2 is an assembled cross-sectional view illustrating the secondary battery of FIG. 1.

FIGS. 1 and 2 are an exploded perspective view and an assembled cross-sectional view illustrating a secondary battery according to an embodiment of the present invention.

Referring to FIGS. 1 and 2, the secondary battery includes an electrode assembly 10, a can 20 for accommodating the electrode assembly 10, and a cap assembly 30 disposed on an opening of the can 20.

The electrode assembly 10 includes a positive electrode plate 11 having a positive electrode collector coated with a positive electrode active material, a negative electrode plate 13 having a negative electrode collector coated with a negative electrode active material, and a separator 15 interposed between the positive electrode plate 11 and the negative electrode plate 13 for preventing a short-circuit between the plates 11 and 13 and allowing for movement of lithium ions.

The positive electrode plate 11 includes a non-coating portion that is not coated with the positive electrode active material, and the negative electrode plate 13 includes a non-coating portion that is not coated with the negative electrode active material.

A positive electrode tab 17 is bonded to the positive electrode non-coating portion and electrically connected to a cap plate, and a negative electrode tab 19 is bonded to the negative electrode non-coating portion and electrically connected to an electrode terminal.

In this case, the positive electrode tab 17 and the negative electrode tab 19 may be respectively bonded to the positive electrode non-coating portion and the negative electrode non-coating portion by ultrasonic welding. The present invention is not limited to the ultrasonic welding.

The positive electrode collector may be formed of stainless steel, nickel, aluminum, titanium, an alloy thereof, aluminum, or stainless steel that is surface-treated with carbon, nickel, titanium, or silver. Preferably, the positive electrode collector is formed of aluminum or aluminum alloy.

The positive electrode collector may be formed as a foil, a film, a sheet, a punched material, a porous material, a foam, and the like. The positive electrode collector has a thickness of 1 to 50 μm and preferably 1 to 30 μm. Here, the positive electrode collector is not limited to such shapes and thicknesses.

The positive electrode active material is capable of inserting or extracting lithium ions. Preferably, the negative positive electrode active material is at least one selected from a group consisting of cobalt, manganese, and nickel and at least one lithium composite oxide.

The negative electrode collector may be formed of stainless steel, nickel, copper, titanium, an alloy thereof, copper, or stainless steel that is surface-treated with carbon, nickel, titanium, or silver. Preferably, the negative electrode collector is formed of copper or a copper alloy.

The negative electrode collector may be formed as a foil, a film, a sheet, a punched material, a porous material, a foam, and the like. The negative electrode collector has a thickness of 1 to 50 μm, preferably 1 to 30 μm. Here, the negative electrode collector is not limited to such shapes and thicknesses.

The negative electrode active material is capable of inserting or extracting lithium ion, and may include a carbon material, such as crystalline carbon, amorphous carbon, carbon composite, and carbon fiber, a lithium metal, a lithium alloy, etc.

The separator 15 is typically formed of a thermoplastic resin, such as poly-ethylene (PE) and polypropylene (PP) and has a surface in a porous film structure.

This porous film structure becomes an insulating film as the separator 15 is melted and the holes are clogged when an internal temperature of the battery is elevated to a melting point of the thermoplastic resin.

The insulating film blocks lithium ion between the positive electrode plate 11 and the negative electrode plate 13 and, accordingly, current no longer flows, thereby stopping elevation of the internal temperature of the battery.

The can 20 may be formed of a metal material and have an upper opening. The can 20 may accommodate the electrode assembly 10 and the electrolyte, and have an insulating casing disposed on the electrode assembly.

The metal material may be light and flexible aluminum, aluminum alloy or stainless steel. When the can 20 is formed of the metal material, it may have a polarity and be used as an electrode terminal.

The can 20 may have a prismatic shape or an elliptical shape with rounded edges. The upper opening of the can 20 is welded or melt-bonded to the cap plate to be sealed.

The cap assembly 30 is coupled with the upper opening of the can 20 and includes an insulating casing 31, a cap plate 32, an insulating gasket 33, an electrode terminal 34, an insulating plate 35, a terminal plate 36, and a plug 37 for an electrolyte injection hole.

The insulating casing 31 is located on the electrode assembly 10 inserted into the can 20 for preventing movement of the electrode assembly 10.

The insulating casing 31 has sidewalls so that the terminal plate 36 and the insulating plate 35 covering the terminal plate 36 are set in the insulating casing 31.

The insulating casing 31 also isolates between the positive electrode tab 17 and the negative electrode tab 19 by a predetermined distance so that they are not short-circuited. The insulating casing 31 may include an external groove serving as a guide.

The insulating casing 31 may be formed of an insulating polymer resin, such as polypropylene (PP), polyphenylene sulfide (PPS), polyethersulfone (PES), or degenerated poly phenylene oxide (PPO).

The cap plate 32 is coupled with the upper opening of the can 20 to seal the opening. The cap plate 32 is a metal plate having the same size and shape as the opening, and includes a terminal hole 32a into which the insulating gasket 33 and the electrode terminal 34 may be inserted.

The cap plate 32 further includes an electrolyte injection hole 32b that provides a passage for injecting the electrolyte into the can 10.

After the electrolyte is injected, the can 20 is sealed by sealing the electrolyte injection hole 32b with the plug 37.

The insulating gasket 33 is coupled with the terminal hole 32a of the cap plate 32. The insulating gasket 33 is formed of a rubber or another nonconductive material having good conductivity to insulate between the electrode terminal 34 and the cap plate 32.

The insulating gasket 33 has a central hole for coupling with the electrode terminal 34. When the insulating gasket 33 is coupled with the electrode terminal 34, it surrounds an outer side of the electrode terminal 34.

The electrode terminal 34 is coupled with the cap plate 32 in such a manner that it is inserted into the hole of the insulating gasket 33. A lower end of the electrode terminal 34 passing through the cap plate 32 is electrically connected to the terminal plate 36.

The insulating plate 35 is formed of an insulating material and located on a lower surface of the cap plate 32 for insulating the cap plate 32 and the terminal plate 36, which is located on the lower surface of the insulating plate 35.

The insulating plate 35 includes a hole corresponding to the terminal hole 32a of the cap plate 32.

The electrode terminal 34 is inserted through the hole and connected with the terminal plate 36 and electrically connected to the negative electrode tab 19 of the electrode assembly 10 welded to the terminal plate 36.

The terminal plate 36 is located on the lower surface of the insulating plate 35. The terminal plate 36 is formed of a conductive material and establishes an electrical path between the negative electrode tab 19 of the electrode assembly 10, which is welded to the lower surface of the terminal plate 36, and the electrode terminal 34.

The cap assembly 30 may further include an insulating member 36a disposed in a partial or an entire region of the terminal plate 36 other than the region to which the negative electrode tab 19 is welded. As illustrated in FIG. 2, the insulating member 36a may include a part locating on a surface to which the negative electrode tab 19 is welded. The insulating member 36a may be disposed in an edge of the lower surface of the terminal plate 36. The insulating member 36a may surround or encase an edge of the terminal plate 36.

The insulating member 36a may be coated with a nonconductive material that is not corroded by the electrolyte, such as poly-ethylene (PE) or poly-ethylene-terephthalate (PET), or may include an insulating tape attached thereon.

The insulating member 36a can prevent the conductive terminal plate forming the cap assembly from stabbing into the electrode assembly or from being brought into contact and short-circuited with the can when the cap assembly finishing the opening of the can is partially distorted and bent toward the electrode assembly by external pressure.

For the secondary battery as the bare cell configured above, a core pack with a protecting circuit board disposed at one side thereof may be subjected to a tubing process with a thin casing and a labeling process, resulting in an inner pack.

Alternatively, the core pack with the protecting circuit board disposed at one side thereof may be received in a separate casing, resulting in a hard pack.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A cap assembly for a secondary battery, comprising:
   a terminal plate within the cap assembly;
   an insulating member disposed in a partial or an entire region of the terminal plate other than a region to which an electrode tab is welded; and
   an insulating plate disposed between a cap plate having a terminal hole and the terminal plate.

2. The cap assembly according to claim 1, wherein the insulating member is coated with poly-ethylene or poly-ethylene-terephthalate.

3. The cap assembly according to claim 1, wherein the insulating member comprises an insulating tape attached thereon.

4. A secondary battery, comprising:
   an electrode assembly including a negative electrode tab and a positive electrode tab;
   a can for accommodating the electrode assembly, the can including an upper opening; and
   a cap assembly for finishing the upper opening, wherein the cap assembly comprises a terminal plate within the cap assembly;
   an insulating member disposed in a partial or an entire region of the terminal plate other than a region to which the negative electrode tab is welded; and
   an insulating plate disposed between a cap plate having a terminal hole and the terminal plate.

5. The secondary battery according to claim 4, wherein the insulating member is coated with poly-ethylene or poly-ethylene-terephthalate.

6. The secondary battery according to claim 4, wherein the insulating member comprises an insulating tape attached thereon.

7. The secondary battery according to claim 4, wherein the can has a prismatic shape or an elliptical shape with rounded edges.

8. The secondary battery according to claim 7, wherein the can is formed of aluminum, aluminum alloy, or stainless steel.

9. The secondary battery according to claim 4, wherein the secondary battery further comprises:
   a protecting circuit board disposed at one side thereof.

10. The secondary battery according to claim 4, wherein the secondary battery is of an inner pack type.

11. The secondary battery according to claim 4, wherein the secondary battery is of a hard pack type.

12. A secondary battery, comprising:
   an electrode assembly including a negative electrode tab connected to a negative electrode plate, a positive electrode tab connected to a positive electrode plate, and a separator disposed between the negative electrode plate and the positive electrode plate;
   a can for accommodating the electrode assembly, the can including an upper opening; and
   a cap assembly enclosing the upper opening, wherein the cap assembly, comprises:
      a terminal plate within the cap assembly; and
      an insulating member disposed in a partial or an entire region of the terminal plate other than a region to which the negative electrode tab is welded; and
      an insulating plate disposed between a cap plate having a terminal hole and the terminal plate.

13. The secondary battery recited in claim 12, wherein the separator has a porous film structure having a plurality of holes.

14. The secondary battery recited in claim 13, wherein the separator is composed of a thermoplastic resin.

15. The secondary battery recited in claim 14, wherein upon an internal temperature of the secondary battery exceeding a melting point of the thermoplastic resin, said plurality of holes are sealed preventing current flow in the secondary battery.

16. The secondary battery recited in claim 12, wherein upon distortion of the cap assembly due to an external force the conductive terminal plate is prevented from contacting the electrode assembly by the insulating member and short-circuiting the secondary battery.

17. The cap assembly according to claim 1, wherein the cap assembly further comprises:
   an insulating gasket coupled with the terminal hole and having a central hole; and
   an electrode terminal coupled with the central hole, wherein the insulating member surrounds or encases an edge of the terminal plate.

18. The cap assembly according to claim 4, wherein the cap assembly further comprises:
an insulating gasket coupled with the terminal hole and having a central hole; and
an electrode terminal coupled with the central hole,
wherein the insulating member surrounds or encases an edge of the terminal plate.

19. The cap assembly according to claim 12, wherein the cap assembly further comprises:
an insulating gasket coupled with the terminal hole and having a central hole; and
an electrode terminal coupled with the central hole,
wherein the insulating member surrounds or encases an edge of the terminal plate.

* * * * *